United States Patent
Hunt et al.

(10) Patent No.: US 10,365,622 B2
(45) Date of Patent: Jul. 30, 2019

(54) CONTROLLING APPLIANCE SETTING BASED ON USER POSITION

(71) Applicant: LENOVO (Singapore) PTE. LTD., New Tech Park (SG)

(72) Inventors: James Anthony Hunt, Chapel Hill, NC (US); Russell Speight VanBlon, Raleigh, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 298 days.

(21) Appl. No.: 15/087,501

(22) Filed: Mar. 31, 2016

(65) Prior Publication Data

US 2017/0285596 A1 Oct. 5, 2017

(51) Int. Cl.
*G06F 17/00* (2006.01)
*G05B 19/00* (2006.01)
*G05B 19/042* (2006.01)

(52) U.S. Cl.
CPC .... *G05B 19/042* (2013.01); *G05B 2219/2642* (2013.01)

(58) Field of Classification Search
CPC .................. G05B 15/02; G05B 19/042; G05B 2219/2642
USPC ........................................................ 700/90
See application file for complete search history.

(56) References Cited

U.S. PATENT DOCUMENTS

| 8,812,136 B2 | 8/2014 | Martin-Cocher et al. |
| 2007/0032225 A1* | 2/2007 | Konicek ........... H04M 1/72513 455/417 |
| 2011/0106278 A1* | 5/2011 | Martin-Cocher .......................... G06Q 10/06314 700/90 |
| 2017/0191695 A1* | 7/2017 | Bruhn .................... G05B 15/02 |

FOREIGN PATENT DOCUMENTS

| CN | 101957617 A | 1/2011 |
| CN | 102984039 A | 3/2013 |
| CN | 104102206 A | 10/2014 |
| CN | 104133459 A | 11/2014 |
| CN | 204101971 U | 1/2015 |
| CN | 104614998 A | 5/2015 |
| CN | 104615000 A | 5/2015 |
| CN | 105159107 A | 12/2015 |
| CN | 204832939 U | 12/2015 |
| CN | 204925662 U | 12/2015 |
| CN | 105388773 A | 3/2016 |

* cited by examiner

*Primary Examiner* — Michael J Brown
(74) *Attorney, Agent, or Firm* — Kunzler Bean & Adamson

(57) ABSTRACT

For controlling an appliance setting based on user position, systems, apparatus, methods, and program products are disclosed. The apparatus may include a processor and a memory that stores code executable by the processor. In one embodiment, the processor monitors user position data for at least one registered user. In another embodiment, the processor identifies a travel scenario based on the user position data. In a further embodiment, the processor controls a setting of an appliance based on an identity of a registered user corresponding to the travel scenario.

17 Claims, 5 Drawing Sheets

CONTROLLING APPLIANCE SETTING BASED ON USER POSITION

BACKGROUND

Field

The subject matter disclosed herein relates to controlling an appliance setting and more particularly relates to controlling the appliance setting based on a location of a registered user.

Description of the Related Art

Historically, appliance settings are manually configured by a user. Programmable controllers allow the user to apply patterns of appliance settings. Timers, motion sensors, geofencing, and other real-time sensors improve the programmability of appliance operation. However, anticipating appliance usage and user preference so as to apply the correct appliance settings is difficult.

BRIEF SUMMARY

An apparatus for controlling an appliance setting based on user position is disclosed. A method and computer program product also perform the functions of the apparatus.

The apparatus may include a processor and a memory that stores code executable by the processor. In one embodiment, the processor monitors user position data for at least one registered user. In another embodiment, the processor identifies a travel scenario based on the user position data. In a further embodiment, the processor controls a setting of an appliance based on an identity of a registered user corresponding to the travel scenario.

In certain embodiments, the processor correlates one or more appliances with a travel scenario. In such embodiments, controlling a setting of an appliance includes the processor controlling a setting for each appliance correlated with the identified travel scenario. In further embodiments, the processor may associate one or more registered users with each appliance. In such embodiments, monitoring user position data includes the processor periodically receiving a current user position of each registered user.

In certain embodiments, the processor identifies a plurality of registered users traveling according to the travel scenario. In such embodiments, controlling a setting of the appliance based on an identity of a registered user corresponding to the travel scenario includes the processor selecting a value for the appliance setting from a user profile belonging to a registered user having a highest priority among the plurality of registered users.

In certain embodiments, the processor accesses calendar information for the at least one registered user. In such embodiments, the processor identifies the travel scenario further based on the calendar information. In some embodiments, the appliance controls a plurality of zones. In such embodiments, controlling a setting of the appliance based on an identity of a registered user includes the processor controlling a setting for a zone selected using the identity of the registered user.

The method for controlling an appliance setting based on user position may include monitoring, by a processor, user position data for at least one registered user. The method may also include identifying a travel scenario based on the user position data. The method may further include controlling an appliance setting based on an identity of a registered user corresponding to the travel scenario.

In certain embodiments, the method includes correlating one or more registered users with an appliance. In such embodiments, monitoring user position data includes periodically receiving a current user position of each registered user. In some embodiments, the method includes associating one or more appliances with a travel scenario, wherein controlling an appliance setting includes controlling an appliance setting for each appliance correlated with the identified travel scenario.

In some embodiments, the method includes correlating one or more appliances with a registered user and selecting an appliance based on the identity of a registered user corresponding to the travel scenario. The appliance is selected from the one or more appliances correlated with the identified registered user. In such embodiments, controlling an appliance setting includes controlling a setting for the selected appliance.

In certain embodiments, the method includes accessing calendar information for the at least one registered user. In such embodiments, identifying a travel scenario is further based on the calendar information. In certain embodiments, the method includes defining a travel scenario based on user movement history and correlating appliance usage with the user movement history, wherein controlling the appliance setting comprises changing an appliance setting of an appliance correlated with the user movement history.

In some embodiments, each travel scenario includes a location registered with a registered user of the at least one registered user. In such embodiments, the appliance is associated with the registered location. In certain embodiments, the appliance controls a plurality of zones. In such embodiments, controlling an appliance setting based on an identity of a registered user includes controlling the appliance setting for a zone associated with the registered user.

In certain embodiments, controlling an appliance setting based on an identity of a registered user traveling according to the travel scenario includes identifying a registered user corresponding to the travel scenario. In such embodiments, controlling the appliance also includes accessing a user profile belonging to the identified registered user and selecting a value for the appliance setting from the user profile.

In some embodiments, controlling an appliance setting based on an identity of a registered user traveling according to the travel scenario includes identifying a plurality of registered users traveling according to the travel scenario and assigning a priority to each of the plurality of registered users based on a conflict policy. In such embodiments, controlling the appliance setting also includes selecting a value for the appliance setting from the user profile of a registered user having a highest priority among the identified plurality of registered users.

The computer program product for controlling an appliance setting based on user position includes a computer readable storage medium that stores code executable by a processor, the executable code including code to perform: monitoring user position data for at least one registered user, identifying a travel scenario based on the user position data, and controlling an appliance setting based on an identity of a registered user corresponding to the travel scenario.

In certain instances, the executable code includes code to perform: associating one or more registered users with an appliance, wherein monitoring user position data includes periodically receiving a current user position of each registered user. In some instances, the executable code includes code to perform: identifying a plurality of registered users corresponding to the travel scenario. In such instances, controlling an appliance setting based on an identity of a registered user corresponding to the travel scenario includes selecting a value for the appliance setting from a user profile belonging to a registered user having a highest priority among the plurality of registered users corresponding to the travel scenario.

In certain instances, executable code includes code to perform: linking one or more appliances with a travel scenario. In such instances, controlling an appliance setting includes controlling a setting for each appliance linked with the identified travel scenario. In some instances, each travel scenario includes a location linked with a registered user of the at least one registered user and controlling an appliance setting includes controlling the appliance setting of an appliance located at a location linked with the identified travel scenario.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
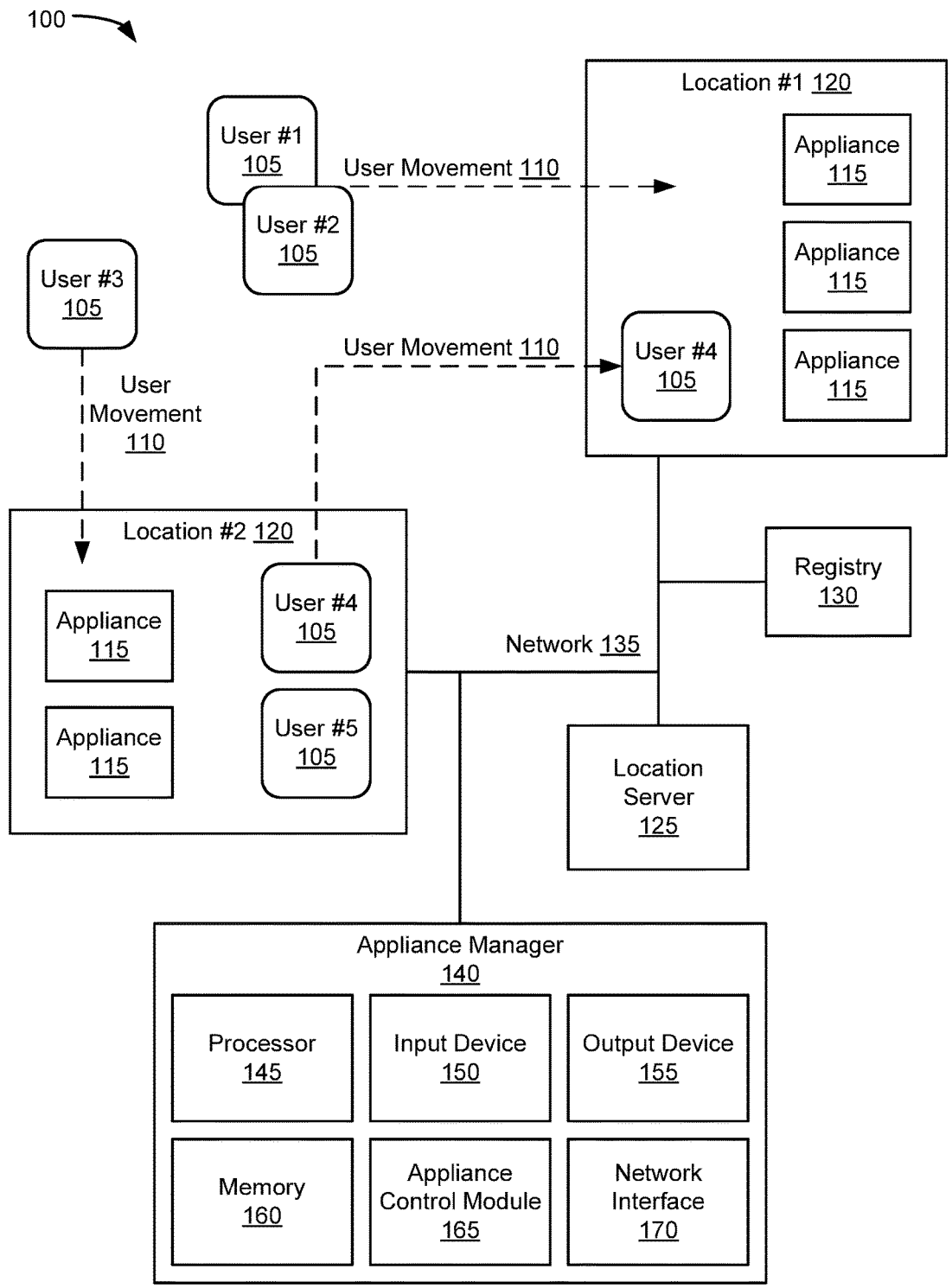
FIG. 1 is a schematic block diagram illustrating one embodiment of a system for controlling an appliance setting based on user position.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the systems, apparatus, method, and program products described herein improve the user's experience of a smart appliance by controlling settings of the smart appliance based on the user's position. Optimizing the smart appliance may include making things more comfortable for a user and/or making the smart appliance less expensive to operate. As an example, as a user travels from their primary residence to a vacation destination (e.g., a vacation home, rental location, hotel, or the like), the vacation destination may activate one or more smart appliances to heat/cool the air, heat water, cool a refrigerator, or recirculate hot water in preparation of the user's arrival.

Further, the optimization depends on which users are arriving at (or leaving from) a location including the smart appliance. For a family, their wearables, mobile phones, or other smart devices may determine who is coming to the location. For example, if only the father is going, then the room temperature may be set to a lower temperature that the father prefers. However, if the mother and/or children are traveling with the father, then the room temperature may be set to a higher temperature based on the preferences of the mother/children.

In another example, unused rooms with in-house may be left colder (or warmer) than rooms expected to be in use, where expected usage of the room is based on which users are traveling to the location including the smart appliance. In one example, if the children are not traveling with parents, a playroom, a child's bedroom, and the like may be left at a cooler/warmer temperature. Additionally, a single room may have different temperature settings depending on which users are attending, accounting for each user's personal preferences. User-configurability allows certain users preferences to take priority over the preferences of other users, as desired by an administrator or primary user of the system.

Further, smart appliances at the primary residence may be adjusted based on which users are traveling to the vacation destination. Of those users remaining at the residence, their preference may now take priority if a user with higher priority left the residence for the vacation destination. For example, if a teenage child remains at the residence while the rest of the family travels to the vacation destination, then the preferences of the teenage child may govern room temperature, etc. As with the vacation destination, temperature settings for the rooms of the residents to be adjusted based on who is expected to occupy rooms and/or use individual smart appliances within the rooms.

The disclosed embodiments apply to travel between homes, travel to home from a store, shopping scenario, a gym, and the like, or to any scenario where a registered user comes or goes to/from a location containing a smart appliance. In one example, user may typically wash his/her hands after returning from the grocery store. They control system detects the user traveling home from the grocery store and signals a hot water heater to prepare hot water for the users wash his/her hands upon arrival at home. A user's habits may be learned based on historical use of the user after traveling to/from a location including the smart appliance. Additional factors may be used to learn a user's habits including a time of day and/or day a week the user perform certain activities.

FIG. 1 is a schematic block diagram illustrating a system 100 for controlling an appliance setting based on user position, according to embodiments of the disclosure. The system 100 includes at least one user device 105 belonging to a registered user. In one embodiment, each registered user is associated with a single user device 105. In other embodiments, a registered user may be associated with more than one user device 105. The user devices 105 generate user position data for the at least one registered user, the user position data indicating user movement 110. Accordingly, the user devices 105 may be a portable and/or wearable electronic device. Examples of user devices 105 include, but are not limited to, a cellular phone, a tablet computer, a fitness tracker, a wearable computer, and the like.

The system 100 also includes at least one smart appliance 115 capable of being remotely monitored and/or controlled and an appliance manager 140 for remotely monitoring and controlling each smart appliance 115. As used herein, a "smart appliance" refers to an appliance or electronic device having network connectivity such that the appliance or electronic device can be monitored and/or controlled remotely. In one embodiment, a smart appliance 115 is also controllable by user device 115 belonging to a registered user. Examples of smart appliances include, but are not limited to, a refrigerator, a water heater, a HVAC, a lighting controller controlling one or more lights in a building, a hot water recirculator, an electric blanket, and the like.

Each smart appliance 115 is located at a smart location 120. As used herein, a "smart location" refers to a location (e.g., a building) where a smart appliance 115 is located. In some embodiments, a smart location 120 may be registered with the appliance manager 140. In one embodiment, the appliance manager 140 monitors and controls each smart appliance 115 located at a smart location 120. In another embodiment, the appliance manager 140 monitors and controls a subset (e.g., at least one, but less than all) of the smart appliances 115 located at the smart location 120. Examples of smart locations 120 include, but are not limited to, a smart home, a smart office, and the like.

The system 100 may optionally include a location server 125 and/or a registry 130. The location server 125 may receive user position data from each user device 105 belonging to a registered user and forward the user position data to the appliance manager 140. In one embodiment, the location server 125 is a location information server (LIS) managed by a mobile communication network operator. The registry 130 may maintain lists of registered users and smart appliances 115 (or optionally smart locations 120) associated with each registered user. In one embodiment, the registry 130 may associate the smart appliances 115 with the smart locations 120. The registry provides the lists and associations to the appliance manager 140.

The appliance manager 140, in one embodiment, controls a setting of a smart appliance 115 in response to user movement 110 of a registered user matching a predefined travel scenario. As used herein, a "registered user" refers to a user of a smart appliance 115 registered with the appliance manager 140. In one embodiment, a user registers directly with the appliance manager 140. In other embodiments, the user may register with the appliance manager 140 indirectly, such as via a web browser, an application server, and the like.

The appliance manager 140 may be any digital device capable of executing computing processes using a microprocessor, microcontroller, or other processing device, including, but not limited to, a general-purpose computing device, a special-purpose (dedicated) computing device, and the like. Examples of an appliance manager 140 include, but are not limited to, a server, a mainframe computer, a personal computer, a mobile phone, a smart phone, a tablet computer, a laptop computer, a handheld computer, a wearable computer, a gaming console, and the like. As depicted, the appliance manager 140 includes a processor 145, an input device 150, an output device 155, a memory 160, an appliance control module 165, and a network interface 170.

The processor 145, in one embodiment, may comprise any known controller capable of executing computer-readable instructions and/or capable of performing logical operations. For example, the processor 145 may be a microcontroller, a microprocessor, a central processing unit (CPU), a graphics processing unit (GPU), an auxiliary processing unit, a FPGA, or similar programmable controller. In certain embodiments, the processor 145 may include a plurality of processing units, such as a plurality processing cores, a plurality of CPUs, a plurality of microcontrollers, or the like. In some embodiments, the processor 145 executes instructions stored in the memory 160 to perform the methods and routines described herein. The processor 145 is communicatively coupled to the memory 160, the appliance control module 165, the input device 150, the output device 155, and the network interface 170.

The input device 150, in one embodiment, may comprise any known computer input device including a touch panel, a button, a keyboard, and the like. The input device 150 is configured to receive input from a user, for example touch input, key press input, and the like. In certain embodiments, the input device 150 may include a microphone or other suitable device for receiving voice input from the user. For example, the user may speak one or more commands, wherein input device 150 receives the one or more commands as voice input.

In one embodiment, the input device 150 includes a touch-sensitive portion, such as a touch-sensitive input panel, configured to receive touch input from the user, such as an input gesture. In some embodiments, at least the touch-sensitive portion of the input device 150 may be integrated with the output device 155, for instance as a touchscreen or similar touch-sensitive display.

The output device 155, in one embodiment, may comprise any known electronic display capable of outputting visual data to a user. As used herein, the output device 155 refers to a physical, electronic display component of the appliance manager 140. For example, the output device 155 may be an LCD display, an LED display, an OLED display, a projector, or similar display device capable of outputting images, text, characters, and the like to a user. The output device 155 may display a user interface, such as a graphical user interface (GUI). In one embodiment, the user interface may include one or more windows.

In some embodiments, the output device 155 may be integrated with at least a portion of the input device 150. For example, the output device 155 and a touch panel of the input device 150 may be combined to form a touchscreen or similar touch-sensitive display. The output device 155 may receive data for display from the processor 145, the memory 160, and/or the appliance control module 165.

The memory 160, in one embodiment, is a computer readable storage medium. In some embodiments, the memory 160 includes volatile computer storage media. For example, the memory 160 may include a random access memory (RAM), including dynamic RAM (DRAM), synchronous dynamic RAM (SDRAM), and/or static RAM (SRAM). In some embodiments, the memory 160 includes non-volatile computer storage media. For example, the memory 160 may include a hard disk drive, a flash memory, or any other suitable non-volatile computer storage device. In some embodiments, the memory 160 includes both volatile and non-volatile computer storage media.

In some embodiments, the memory 160 stores additional data relating to confining data 110 based on location. For example, the memory 160 may store an encryption key, a location property 115, a location restriction, and the like. In certain embodiments, the memory 160 is a storage device for storing the data 110 to be protected (e.g., user data, a virtual machine, and/or virtual machine data). In some embodiments, the memory 160 also stores program code and related data, such as an operating system or other controller algorithms operating on the appliance manager 140.

The appliance control module 165, in one embodiment, monitors user position data (generated by a user device 105) to identify user movement 110 for at least one registered user. The appliance control module 165 additionally identifies a travel scenario based on the user position data. In one embodiment, the appliance manager 140 compare the user movement 110 to one or more pre-stored travel scenarios in order to identify a travel scenario. The appliance control module 165 further controls a setting of a smart appliance 115 based on an identity of a registered user corresponding to the travel scenario.

Embodiments of the appliance control module 165 are described in further detail below. In some embodiments, the appliance control module 165 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

The network interface 170, in one embodiment, is configured to communicate with one or more external modules, computers, data repositories, or other nodes on the network 135. The network interface 170 may be wired and/or wireless. Similarly, the network 135 may be a wired network, a wireless network, and/or may include both wireless and wired portions. The network interface 170 may comprise communication hardware and/or communication software for communicating with nodes on the network 135. In some embodiments, one or more instructions may be transmitted from the appliance manager 140 to a smart appliance 115 via the network interface 170. In other embodiments, the appliance manager 140 may receive data from a smart appliance via the network interface 170.

Figure 2:
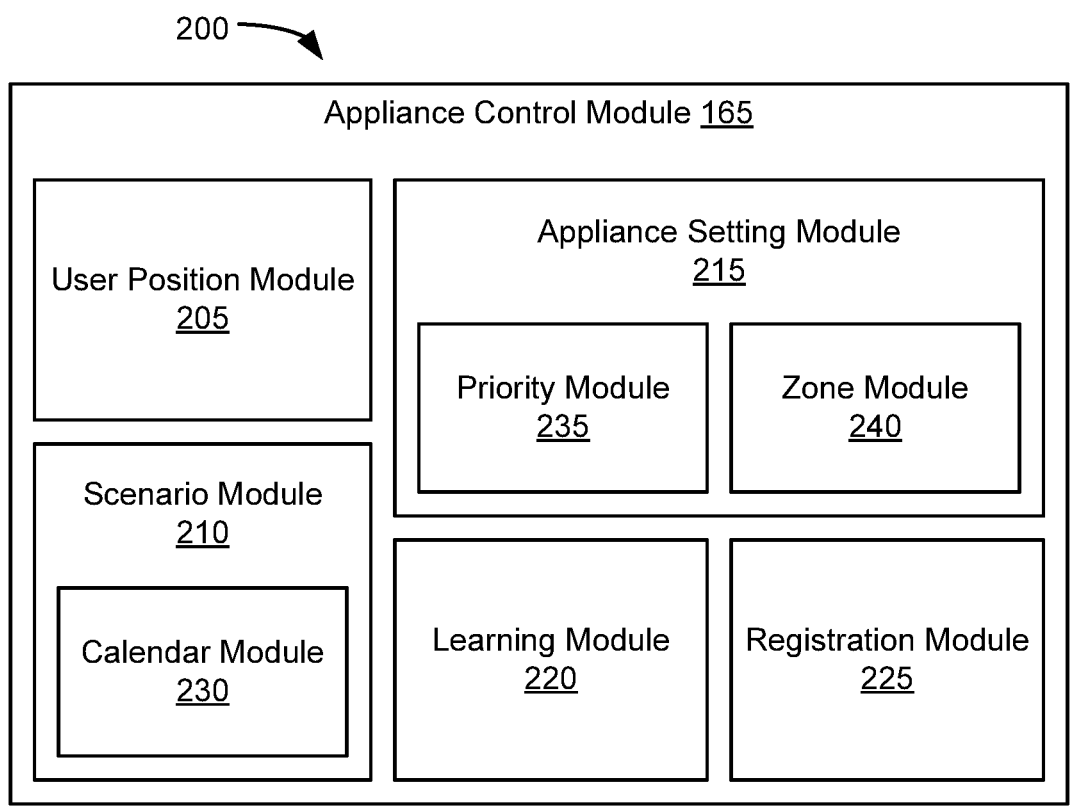
FIG. 2 is a schematic block diagram illustrating one embodiment of an appliance control apparatus for controlling an appliance setting based on user position.

FIG. 2 is a schematic block diagram illustrating an appliance control apparatus 200 for controlling an appliance setting based on user position, according to embodiments of the disclosure. The apparatus 200 includes an appliance control module 165, which may be one embodiment of the appliance control module 165 described above with reference to FIG. 1. The appliance control module 165 includes a user position module 205, a scenario module 210, and an appliance setting module 215.

As depicted, the appliance control module 165 may also include one or more of: a learning module 220, a registration module 225, a calendar module 230, a priority module 235, and a zone module 240. The modules 205-240 may be communicatively coupled to one another. The appliance control module 165 may comprise hardware circuits, program code operating on a processing device, or a combination of hardware circuitry and program code.

The user position module 205, in one embodiment, is configured to monitor user position data for at least one registered user. As used herein, "monitoring user position data" refers to periodically receiving user position data and determining whether the received user position data meets one or more criteria. As used herein "user position data" refers to data describing the geographic positions of one or more registered users. User position data may be received from a mobile communication device, a wearable computer, or the like. The user position data may include geo-positional coordinates, such as those received from a satellite positioning system, and/or a network coverage region, such as the radio coverage area of a cell in a mobile communication network. The user position module 205 may derive user movement 110 from the user position data.

In some embodiments, the user position module 205 identifies a current user position for each registered user. In certain embodiments, the user position module 205 stores current positions for each registered user in the memory 160. In other embodiments, the user position module 205 include storage media, such as a memory buffer, RAM, flash memory, and the like, for storing the user position data. The user position module 205 may comprise hardware circuits, program code operating on a processing device, or a combination of hardware circuitry and program code.

In some embodiments, the user position module 205 determines whether a registered user's position corresponds to a predefined location associated with that registered user. For example, one or more locations may be predefined (e.g., user defined or automatically defined by the learning module 220), with each location including a range of coordinates. The user position module 205 may compare a current position (e.g., current coordinates) of a registered user to the coordinate ranges corresponding to the one or more predefined locations in order to determine whether the registered user is present at the predefined location. Where the user's current position matches a coordinate corresponding to a predefined location, the user position module 205 determines that the registered user is present at the predefined location. The predefined location may be a smart location 120 or maybe another location frequented by a registered user. Examples of predefined locations include, but are not limited to, a workplace, a residence, a grocery store, a gym, a vacation destination (e.g., hotel or vacation home), and the like.

In some embodiments, the user position module 205 accesses a list of registered users (e.g., stored in memory 160) and receives (or retrieves) user position data for each registered user on the list. For example, the user position module 205 may access a list of registered users associated with one or more smart appliances 115 that is stored in the registry 130. In one embodiment, each registered user on the list of registered users grants the user position module 205 permission to track his or her position data.

In certain embodiments, the user position module 205 retrieves the user position data by querying a network entity, such as the location server 125, for user position data for each registered user on the list. In other embodiments, a user device 105 (e.g., mobile communication device, wearable computer, or other electronic device belonging to a registered user) transmits position data, or position updates, to the user position module 205 at regular intervals. In further embodiments, a registered user may transmit its user position data to an intermediary, such as an application server, a location server 125, or the like, wherein the intermediary forwards the user position data to the user position module 205.

In one embodiment, the user position module 205 determines user movement 110 for each registered user based on the monitored user position data. The user movement 110 may include a travel vector and/or a travel path. A travel vector may include a speed at which the registered users traveling as well as a direction/orientation of travel. A travel path may indicate a route or course of travel between two or more predefined locations. In a further embodiment, the user position module 205 may determine one or more candidate destinations for the registered user based on that user's movement 110. As used herein, a candidate destination is a likely destination of the registered user and may be a smart location 120, such as a smart residence, a smart business place, and the like.

In another embodiment, the user position module 205 may determine a location (e.g., building, city, neighborhood, or the like) corresponding to a user's position. For example, the user position module 205 may compare a current user position to one or more predefined locations. Where the current user position is within a threshold distance of a predefined location, the user position module 205 may determine that the current user's position corresponds to that predefined location. For example, the user position module 205 may determine whether a registered user is at home, at school, at work, or the like by comparing the current position to predefined locations associated with the registered user. Different locations may be associated with different distance thresholds. Further, the user position module 205 may determine whether a registered user is traveling between one or more pre-stored locations (e.g., commuting home from work or vice versa).

The scenario module 210, in one embodiment, is configured to identify a travel scenario based on the user position data. In one embodiment, the scenario module 210 receives (from the user position module 205) user position data, such as a current user position and/or a predefined location closest to a user's current position, for one or more registered users. In further embodiments, the scenario module 210 may also receive user movement 110, such as a travel vector or travel path, for the one or more registered users. The scenario module 210 analyzes the data received from the user position module 205 to identify a travel scenario for at least one registered user. The scenario module 210 may comprise hardware circuits, program code operating on a processing device, or a combination of hardware circuitry and program code.

As used herein, a "travel scenario" refers to a pattern of user movement to and/or from a location containing a smart appliance, wherein the pattern of user movement is correlated with a change in an appliance setting of the smart appliance. The scenario module 210 determines whether a registered user travels according to a defined travel scenario. Each travel scenario may be user defined and/or may be automatically learned (e.g., by the learning module 220). Examples of travel scenarios include, but are not limited to, travelling to a vacation home, travelling to work, returning home from work, returning home from a store, gym, or other location.

A travel scenario includes one or more locations, where at least one location of the travel scenario has a smart appliance with one or more settings controllable by the appliance control module 165. The one or more locations in travel scenarios may be associated with a registered user. Examples of locations in a travel scenario include, but are not limited to, a residence of registered user, an office space of the registered user, a restaurant or eatery, a store or shopping center, a gym, park, or recreational area, and the like. The one or more locations included with a travel scenario may be user defined or may be automatically learned (e.g., by the learning module 220).

In one embodiment, the scenario module 210 identifies a number of users associated with the travel scenario. For example, the scenario module 210 may identify that three registered users are traveling together, and that their current location and/or travel path indicate a particular travel scenario. The scenario module 210 may further indicate the identity of each registered user associated with the travel scenario.

In one embodiment, the scenario module 210 receives calendar information for at least one registered user and uses the calendar information to identify travel scenario. For example, the scenario module 210 may include a calendar module 230 which, for each registered user, accesses a calendar to identify events, travel plans, etc. Thereafter, the scenario module 210 identify the travel scenario for the based on calendar information (e.g., for each registered user) provided by the calendar module 230.

The appliance setting module 215, in one embodiment, controls a setting of an appliance based on the identity of a registered user corresponding to the travel scenario. As user herein, a registered user "corresponding" to the travel scenario refers to a registered user whose movement patterns and/or location match the travel scenario. Accordingly, the registered user may be said to be "travelling" according to the travel scenario.

Importantly, the appliance setting module 215 control the appliance setting based on the identity of one or more registered users travelling according to the travel scenario. In one embodiment, the travel scenario is not be user specific, such that any registered user may correspond to the travel scenario. The appliance setting module 215 sets the appliance setting to a specific value based on the identity of the registered user corresponding to the travel scenario. Accordingly, the appliance setting module 215 controls the appliance based on who is arriving/departing from the location including the appliance.

In some embodiments, the appliance setting module 215 receives an identity of a travel scenario and an identity of a registered user corresponding to the travel scenario from the scenario module 210. In other embodiments, the appliance setting module 215 may determine the identity of a registered user corresponding to the (received) travel scenario identity by examining user position data. The appliance setting module 215 may comprise hardware circuits, program code operating on a processing device, or a combination of hardware circuitry and program code.

For example, the user position module 205 may monitor a registered user's position and determine that the registered user was at the gym and is now traveling home. In response, the scenario module 210 may identify the travel scenario as being "returning home from the gym." Here, the user's home is a predefined location associated with the travel scenario and includes at least one smart appliance, such as a smart water heater. In response to the scenario module 210 identifying the "returning home from the gym" travel scenario, the appliance setting module 215 may identify the water heater as an appliance whose setting is to be controlled. Here the appliance setting module 210 may control the water heater to recirculate hot water, so that hot water is ready at the tap when the user reaches home.

In certain embodiments, the appliance setting module 215 also identifies a number of users travelling according to the travel scenario and controls the appliance setting differently based on the number of users. For example, the travel scenario may be "returning home from the gym," and registered users may frequently take a shower after returning from the gym. Accordingly, a water heater appliance may be associated with this travel scenario. If the appliance setting module 215 determines that only one registered user is associated with the travel scenario (e.g., only one user is travelling home from the gym), then the appliance setting module 215 control a water heater setting to prepare hot water for one individual. However, if the appliance setting module 215 determines that two (or more) registered users are associated with the travel scenario (e.g., at least two users are travelling home from the gym), then the appliance setting module 215 controls the water heater differently, so as to prepare hot water for two (or more) individuals.

In some embodiments, the appliance setting module 215 identifies one or more locations corresponding to the travel scenario, wherein each of the one or more locations includes at least one smart appliance. In one embodiment, the appliance setting module 215 receives, from the scenario module 210, the location(s) corresponding to the travel location. In another embodiment, the appliance setting module 215 looks up the corresponding location(s) using a table, database, or other data structure stored in the memory 160.

The appliance setting module 215 may further identifies each appliance associated with the travel scenario (e.g., each smart appliance located at a location corresponding to the travel scenario). In one embodiment, the appliance setting module 215 looks up the appliances associated with the travel scenario using a table, database, or the data structure stored in the memory 160. Where multiple appliances are associated with the travel scenario, the appliance setting module 215 may control a setting for each associated appliance.

In some embodiments, an appliance may operate in a plurality of zones. As used herein, a "multi-zone" appliance refers to a smart appliance that operated in and/or controls more than one zone. For example, a HVAC appliance may control temperatures in a plurality of rooms. As another example, a lighting appliance may control lights in a plurality of rooms. The appliance setting module 215 controlling an appliance setting may include controlling a set of one or more setting for each zone in which the multi-zone appliance operates and/or controls.

In certain embodiments, the appliance setting module 215 may apply a different setting to each zone controlled by a multi-zone appliance. For example, the appliance setting module 215 may apply different temperature settings for each room controlled by the HVAC appliance. As another example, the appliance setting module 215 may apply different lighting settings for each room controlled by the lighting appliance. In further embodiments, the appliance setting module 215 selects the appliance setting at each zone based on a registered user associated with that zone. For example, the temperature and/or lighting setting may be selected for a bedroom based on a registered user using that bedroom. The appliance setting module 215 may include a zone module 240 that associates one or more zones with a multi-zone appliance and may further associate a registered user with a particular zone.

In some embodiments, the appliance setting module 215 controls the appliance setting using a time parameter. For example, the appliance setting module may send a control message to the smart appliance that includes a time parameter indicating a duration of time during with the appliance setting is valid (e.g., is to be applied). The time parameter may include a starting time and one of an ending time and a duration, after which the appliance setting may revert to its previous value or to a default value.

As an example, if a registered user is traveling to a vacation home, the scenario module 210 may identify the travel scenario as "traveling to vacation home" and the appliance setting module 215 may instruct a smart water heater appliance at the vacation home to begin heating water at a specific time indicated by a time parameter. The time parameter may further indicate to the smart water heater appliance when it is to stop heating water (e.g., at the end of an expected stay by the registered user).

In certain embodiments, the appliance setting module 215 controlling an appliance setting includes activating and/or deactivating the appliance based on the travel scenario and on the identity of the registered user corresponding to the travel scenario. For example, the appliance setting module 215 may control a smart coffee maker to turn on and begin producing coffee based on a particular travel scenario, such as the registered user traveling to work (where the smart coffee maker is located at the registered user's workplace). As another example, the appliance setting module 215 may control a lighting system to turn off all the lights based on a particular travel scenario, such as the registered user traveling home from a vacation destination (where the lights are located at the vacation destination).

In some embodiments, the appliance setting module 215 controls an appliance setting of based on the identity of a registered user corresponding to the travel scenario by selecting a value for the appliance setting based on a user profile belonging to the registered user. For example, one or more user profiles may be stored in memory 160, wherein the appliance setting module 215 accesses the user profile corresponding to the registered user and applies an appliance setting based on a value found in the user profile.

A user profile may include preferred appliance settings for the registered user corresponding to the user profile. The user profile may be initially populated with default values selected based on the user's demographic and may be later customized by the user (e.g., by manual input or by learning the user's preferences). For example, the preferred appliance settings may include a preferred temperature setting (e.g., for an HVAC appliance), a preferred lighting level (e.g., for a lighting appliance), a preferred water temperature, refrigerator temperature, and the like. A user profile may also include activities the user habitually performs upon traveling to/from a particular location, such as washing hands after returning from the store, taking shower after returning from the gym, and the like.

In certain embodiments, two or more registered users may be identified as corresponding to an identified travel scenario. For example, the two or more registered users may be traveling together, wherein the scenario module 210 identifies a travel scenario associated with the movement of the two or more registered users. In such embodiments, the two or more registered users may have different preferred settings for an appliance associated with the travel scenario. As an example, the tumor registered users may have different preferred temperature settings for a smart HVAC appliance associated with the travel scenario.

Where there is a conflict between the different user's preferences, the appliance setting module 215 may select an appliance setting based on a registered user having the highest priority among the two or more registered users. In some embodiments, the appliance setting module 215 may include a priority module 235 which identifies the registered user having the highest priority among the two or more registered users corresponding to the identified travel scenario. The appliance setting module 215 may then select a setting value for the appliance subject to the conflict based on the preferred setting of the user having the highest priority.

The learning module 220, in one embodiment, is configured to automatically discover and generate one or more travel scenarios based on the user position data. As used herein, "discovering" a travel scenario refers to identifying a pattern of user movement 110 to and/or from a smart location 120 containing one or more smart appliances 115. Discovering a travel scenario further includes determining whether one or more settings of the one or more smart appliances are consistently changed (e.g., exhibiting a strong correlation) with the pattern of user movement.

The learning module 220 "generates" a travel scenario by storing (e.g., in memory 160), reporting, or otherwise denoting the statistically significant pattern of user movement as well as those smart appliances whose changes in settings are correlated with the user movement. For example, changes to room temperature settings, water temperature settings, lighting levels, and other appliance settings may consistently occur with the statistically stinging and pattern of user movement. The learning module 220 may comprise hardware circuits, program code operating on a processing device, or a combination of hardware circuitry and program code.

In some embodiments, the learning module 220 stores user position data as movement history and analyzes the movement history in order to identify patterns of user movement. Similar patterns of user movement may be distinguished from one another based on a time the movement takes place. The learning module 220 may further store identify when the appliance settings of one or more smart appliances are changed, and optionally the values to which they are changed. The learning module 220 may compare times of user movement to times of appliance setting changes in order to determine whether a setting change of a smart appliance corresponds to user movement to and/or from a location where the smart appliances located.

If the appliance setting is consistently changed when a registered user travels to and/or from the location where the smart appliances located, then the learning module 220 may generate a travel scenario that includes the identified pattern of user movement and the appliance who setting is consistently changed. For example, if the ratio of a number of times the appliance setting is changed compared to a number of times the movement pattern occurs exceeds the threshold ratio, then the learning module 220 may determine that the appliance setting change is correlated with the pattern of user movement.

In some embodiments, the learning module 220 may correlate one or more appliances with the travel scenario. In one embodiment, the learning module 220 may identify one or more smart appliances who settings are adjusted by a registered user when that registered user travels to a location containing the one or more smart appliances. The learning module 220 may track the number of times the registered user travels to the particular location in the number of times the user adjusts an appliance setting to particular value.

Where the registered user travels to the particular location (having one or more smart appliances) more than a threshold number of times, a candidate travel scenario may be identified. Further, where the registered user adjust the appliance setting to the particular value more than a threshold number of times (alternatively, more than a threshold ratio) when traveling to the location, the appliance (and the appliance setting) may be associated with the candidate travel scenario. Additionally, the particular value may be associated with the registered user and the appliance setting, such that the appliance setting module 215 automatically set the appliance setting to the particular value upon the scenario module 210 detecting the candidate travel scenario.

In one embodiment, a registered user must manually accept/validate a candidate travel scenario generated by the learning module 220 before that travel scenario is added to a set of travel scenarios selectable by the scenario module 210. In another embodiment, the learning module 220 automatically adds a candidate travel scenario to the set of travel scenarios selectable by the scenario module 210 in response to the registered user traveling to the location and adjusting the appliance setting more than the threshold number of times. In both embodiments, a registered user may manually delete a candidate travel scenario or otherwise remove it from the set of travel scenarios selectable by the scenario module 210.

In certain embodiments, the learning module 220 stores the value of the appliance setting being changed in connection with a travel scenario. The learning module 20 may further identify the registered user that travels to and/or from the location with a smart appliance was appliance setting is changed. The learning module 220 may store the appliance setting value in a user profile for the identified registered user. The appliance setting module 215, when controlling the appliance in response to the scenario module 210 identifying the learned travel scenario, accesses the user profile and applies the learned appliance setting value.

In some embodiments, the learning module 220 automatically links a registered user with a particular smart appliance in response to determining that the registered user of the present at a location of the smart appliance whenever a change occurs to an appliance setting of the smart appliance. The learning module 220 may further identify values to which the appliance settings are changed and associate these appliance setting values with the registered user. Additionally, the learning module 220 may link the registered user to the location where the smart appliances located. Thereafter, the scenario module 210 may monitor for a pattern of movement of the registered user indicating that the user is moving to and/or from the linked location. The appliance setting module 215 may then control the linked smart appliance(s) in response to the scenario module 210 determining that the user is moving to and/or from the linked location.

In further embodiments, the learning module 220 may identify priority among the plurality of registered users associated with a travel scenario. For example, the learning module 220 may determine that when a first registered user is identified as traveling according to a particular travel scenario, a preferred setting of the first registered user is applied instead of a preferred setting for second registered user identified as traveling with the first registered user. Additionally, the learning module 220 may determine that when a third registered user and the first registered user travel together in the particular travel scenario, a preferred setting of the third registered user is applied instead of the preferred setting of the first registered user. Therefore, the learning module 220 may determine that, for the particular travel scenario, the third registered user has priority over the first registered user, and the first registered user has priority over the second registered user. In certain embodiments, the learning module 220 stores the determined priorities in a conflict policy.

The learning module 220 may be further configured to detect changes to previously discovered travel scenarios. For example, a particular travel scenario may be defined wherein a registered user consistently washes his/her hands after returning from the grocery store. Detecting this travel scenario may trigger the appliance setting module 215 to control a water heater to recirculate hot water immediately prior to the user returning home, so that hot water is ready at the tap for the registered user to wash his/her hands upon returning home. Later, however, the registered user may stop washing his/her hands after returning from the grocery store. The learning module 220 may detect the change to the previously defined travel scenario and modify and/or remove the travel scenario based on the detected changes to the registered user's habits.

The registration module 225, in one embodiment, is configured to correlate a registered user, a travel scenario, an appliance, and/or a location. The registration module 225 receives user input, for example via a web browser or other user interface, and correlates the registered user, travel scenario, appliance, and/or location based on the user input. The user input may be received directly (e.g., via input device 150) or may be received via an intermediary (e.g., received from a remote input device via network interface 170). The registration module 225 may comprise hardware circuits, program code operating on a processing device, or a combination of hardware circuitry and program code.

In one embodiment, the user input registers one or more users with the system 100. For example, one or more users may sign up with the system 100 via the registration module 225. In another embodiment, the user input may register one or more smart appliances for monitoring/control by the system 100. In yet another embodiment, the user input may define one or more locations, including a home, a work location, a gym, a shopping center, a school, and the like. Additionally, the user input may de-register a user, an appliance, and/or a location.

In some embodiments, the registration module 225 receives user input defining a travel scenario (e.g., traveling from home to work, traveling from work to home, traveling from the store to home, and the like). Defining a travel scenario may include identifying one or more appliances whose settings are to be controlled (e.g., adjusted) when the travel scenario is detected. Defining a travel scenario may further include identifying one or more users whose preferences are to be used in controlling the identified one or more appliances. For example, the first registered user may prefer a certain temperature setting for that user's bedroom, wherein no other registered user's preference is to be used in controlling the first registered user's bedroom temperature.

In certain embodiments, the registration module 225 receives user input to correlate one or more appliances with a predefined travel scenario. For example, where the predefined travel scenario is "returning home from the gym," the registration module 225 may receive user input that correlates a water heater appliance, a HVAC appliance, and a lighting appliance with that travel scenario. The predefined travel scenario may be user defined or may be automatically generated by the learning module 220. In one embodiment, the appliance setting module 215 controls an appliance setting for each appliance registered with a particular travel scenario.

Additionally, the registration module 225 may receive user input that correlates one or more location with a predefined travel scenario. Continuing the above example, the registration module 225 may receive user input that correlates a gym location and a home location with the travel scenario "returning home from the gym."

In some embodiments, the registration module 225 may receive user input for correlating one or more registered users with a particular appliance. For example, the particular appliance may be a smart coffee maker, wherein only registered users above a certain age may be registered with the smart coffee maker. In further embodiments, the registration module 225 may receive user input that correlates one or more smart appliances with each registered user. The correlated one or more smart appliances may be those smart appliances whose settings the registered user is permitted to control. For example, a registered user that is a child may not be permitted to control certain smart appliances, therefore the registration module 225 may only correlate those smart appliances the child is permitted to control with the child. A list of smart appliances a particular registered user is permitted to control (or alternatively, a list of smart appliances a particular registered user is not permitted control) may be stored in a user profile of that particular registered user.

In some embodiments, the registration module 225 receives user input, such as via a web browser or similar user interface, indicating a user preference for an appliance setting. The user preference may be defined in relation to a specific travel scenario. For example, where the travel scenario includes the registered user traveling from home to work, the registration module 225 may receive a temperature setting of the home while the registered user is at work. In contrast, where the travel scenario includes the registered user traveling from work to home, the registration module 225 may receive a different temperature setting up the home.

In certain embodiments, the user input may override pre-existing value for the appliance setting. For example, the user input may override a default value for the appliance setting. As another example, the user input may override a learned value for the appliance setting generated by the learning module 220. Still further, the user input may override a value previously defined by the user. In some embodiments, the pre-existing appliance setting value may be located in a user profile, wherein the registration module 225 updates the user profile based on the override value indicated by the user input.

The priority module 235, in one embodiment, identifies a registered user having the highest priority among two or more registered users associated with the same travel scenario. In certain embodiments, the priority module 235 may assign each registered user with a priority level. The priority module 235 may assign priority based on a conflict policy for governing conflicts between two or more registered users.

In one embodiment, the priority level for each registered user may be universally applicable between all registered users. However, in other embodiments, the priority level for each registered user may be on a scenario-by-scenario basis. For example, the first registered user may have higher priority than a second registered user for first travel scenario, but may have lower priority than the second registered user for a second travel scenario.

The priority module 235 may indicate to the appliance setting module 215 the registered user having the highest priority among the two or more registered users associated with the same travel scenario. The appliance setting module 215 may then control an appliance setting based on the user having the highest priority. In one embodiment, the appliance setting module 215 controls the appliance setting based on a user profile belonging to the registered user having the highest priority among the two or more registered users associated with the same travel scenario.

The priority module 235 may receive an indication of the identified travel scenario from the scenario module 210 and/or appliance setting module 215. In certain embodiments, the priority module 235 may additionally receive indication of the registered users associated with the travel scenario from the scenario module 210 and/or appliance setting module 215. Alternatively, the priority module 235 may access a location in the memory 160 to retrieve the travel scenario identified by the scenario module 210 and/or the registered users associated with the identified travel scenario.

The priority module 235 may comprise hardware circuits, program code operating on a processing device, or a combination of hardware circuitry and program code. As depicted, the priority module 235 may be a component of the appliance setting module 215. For example, the priority module 235 may be a hardware component of the appliance setting module 215. As another example, the priority module 235 may be a subroutine of the appliance setting module 215. However, in other embodiments the priority module 235 may be an independent component communicatively coupled to the appliance setting module 215.

The zone module 240, in one embodiment, identifies a multi-zone appliance and correlates one or more zones with the multi-zone appliance. In some embodiments, the zone module 240 also correlates one or more zones of a multi-zone appliance with a travel scenario. In some embodiments, the zone module 240 correlates one or more zones controlled by a multi-zone appliance with a particular registered user. For example, the zone module 240 may identify that a first registered user consistently uses a particular bedroom at a vacation home, the bedroom being a zone controlled by a smart HVAC appliance (e.g., a multi-zone appliance). The zone module 240 may correlate the first registered user with that particular bedroom such that the appliance setting module 215 controls a setting for the particular bedroom based on the first registered user's preferences and/or user profile.

As an example, a first travel scenario may be a first registered user traveling to a vacation home at a second travel scenario may be three or more registered users traveling to the vacation home. The vacation home may include one or more multi-zone appliances including a smart HVAC appliance which controls temperatures for a plurality of rooms. The zone module 240 may identify the zones controlled by the smart HVAC appliance and further associate a first bedroom with a first travel scenario and at least three bedrooms with the second travel scenario. When the scenario module 210 identifies the first travel scenario (e.g., based on only the first registered user traveling to the vacation home), the appliance setting module 215 may control the temperature setting of only the first bedroom associated with the first travel scenario. However, when the scenario module 210 identifies the second travel scenario (e.g., based on the three or more registered users traveling to the vacation home), the appliance setting module 215 may control the temperature settings of the at least three bedrooms associated with the second travel scenario.

The zone module 240 may comprise hardware circuits, program code operating on a processing device, or a combination of hardware circuitry and program code. As depicted, the zone module 240 may be a component of the appliance setting module 215. For example, the zone module 240 may be a hardware component of the appliance setting module 215. As another example, the zone module 240 may be a subroutine of the appliance setting module 215. However, in other embodiments the zone module 240 may be an independent component communicatively coupled to the appliance setting module 215.

The calendar module 230, in one embodiment, is configured to access calendar information for each registered user. The calendar module 230 may provide the calendar information to the scenario module 210, wherein the scenario module identifies a travel scenario based on calendar information. The calendar information may indicate events and/or plans of a register user. For example, the calendar information may indicate that the registered user intends to take vacation on a certain date. In this example, the calendar module 260 may indicate the user's vacation plan to the scenario module 210, wherein the scenario module 210 may determine that the registered user's position data indicates travel to a vacation home rather than to another location registered with the user.

In some embodiments, the calendar module 230 imputes calendar information of one registered user to another user. For example, if a first registered user has calendar information indicating a scheduled vacation, this scheduled vacation may be imputed to other registered users with whom the first registered user regularly goes on vacation, such as family members of the first registered user. In certain embodiments, relationships between registered users may be indicated in user profiles for those users. In another example, the calendar module 230 may use context of the calendar information to determine whether a scheduled event is to be imputed to other registered users.

The calendar module 230 may comprise hardware circuits, program code operating on a processing device, or a combination of hardware circuitry and program code. As depicted, the calendar module 230 may be a component of the scenario module 210. For example, the calendar module 230 may be a hardware component of the scenario module 210. As another example, the calendar module 230 may be a subroutine of the scenario module 210. However, in other embodiments the calendar module 230 may be an independent component communicatively coupled to the scenario module 210.

Figure 3:
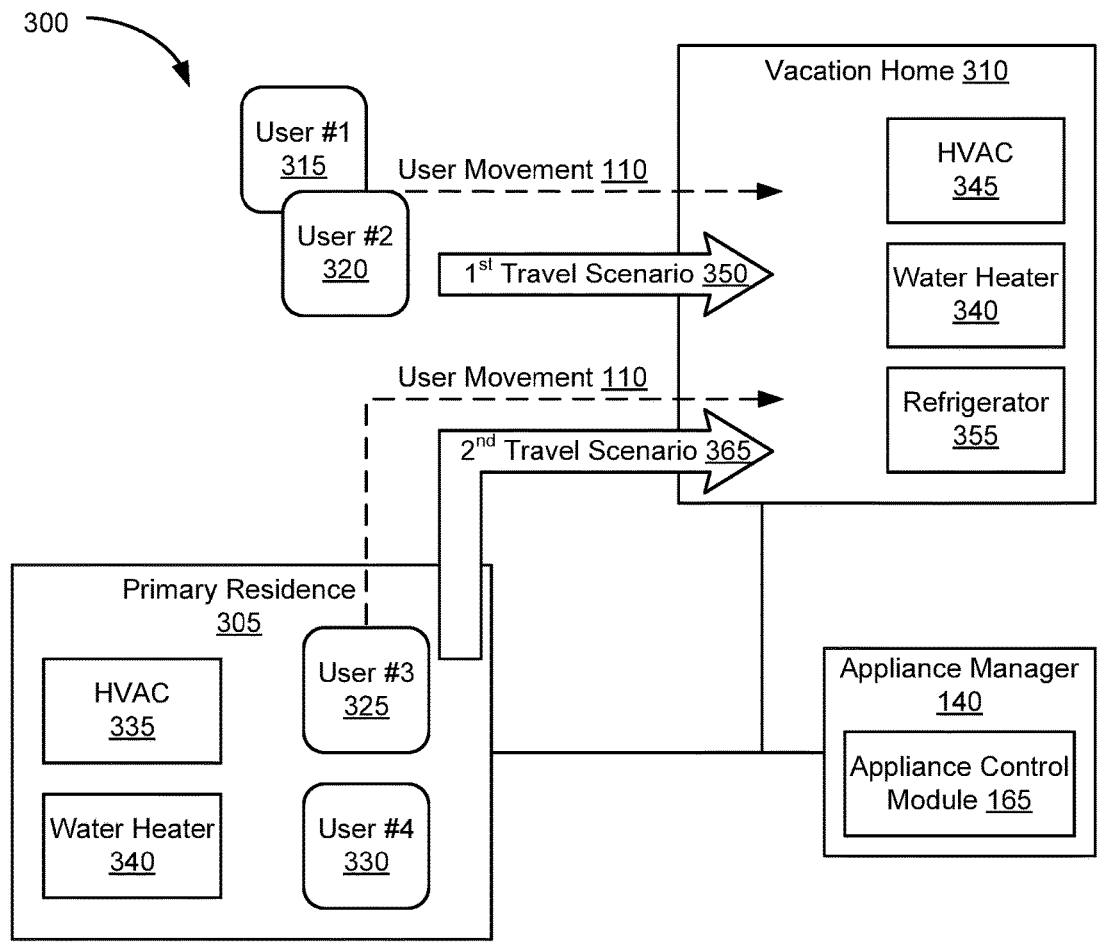
FIG. 3 is a diagram illustrating one embodiment of controlling an appliance setting based on user position.

FIG. 3 is a diagram 300 illustrating one embodiment of controlling an appliance setting based on user position. FIG. 3 depicts an appliance manager 140 which contains an appliance control module 165. The appliance manager 140 and the appliance control module 165 may be substantially as described above with reference to FIGS. 1 and 2. The appliance manager 140 is connectively coupled to a primary residence 305 and to a vacation home 310. Each of the primary residence 305 and the vacation home 310 is a smart location 120 containing at least one smart appliance 115. Here, the primary residence 305 includes a first HVAC 335 and a first water heater 340. The vacation home 310 includes a second HVAC 345, a second water heater 350, and a refrigerator 355. Each of the appliances 335-355 are smart appliances 115, and are thus capable of being monitored and controlled remotely (e.g., by the appliance manager 140).

FIG. 3 further depicts at least four registered users: a first user 315, a second user 320, a third user 325, and a fourth user 330. The appliance manager 140, specifically the appliance control module 165, monitors user position data for each of the registered users 315-330. FIG. 3 also depicts user movement 110 (comprising user movement 110a and user movement 110b) by the first user 315, the second user 320, and the third user 325. Here, each of the users 315-325 are traveling to the vacation home 310.

By monitoring the user position data for the first and second users 315-320, the appliance control module 165 detects that the first user 315 and the second user 320 traveling together (depicted by a user movement 110a). Further, based on the positions, travel paths, and/or travel vectors of the first and second users 315-320, the appliance control module 165 determines that the user movement 110a matches a first travel scenario 360. Here, the first travel scenario 360 corresponds to a scenario of "traveling to vacation home." Accordingly, the appliance control module 165 identifies one or more of the appliances 345-355 associated with the first travel scenario 360.

In one embodiment, the second HVAC 345 is associated with the first travel scenario 360. The second HVAC 345 may be deactivated when there are no occupants at the vacation home 310. Thus, the appliance control module 165 may control a setting of the second HVAC 345 in order to activate the second HVAC 345 in response to detecting the first travel scenario 360. Further, the appliance control module 165 may control temperatures at the vacation home 310 by instructing the second HVAC 345 to apply at least one specific temperature setting value, for example based on a user profile.

In another embodiment, the second water heater 350 is associated with the first travel scenario 360. The second water heater 350 may be deactivated when there no occupants at the vacation home 310. Thus, the appliance control module 165 may control setting of the second water heater 350 in order to activate the second water heater 350 in response to detecting the first travel scenario 360. Further, the plants control module 165 may instruct the second water heater 340 to apply specific water temperature setting, for example based on user profile.

Additionally, the refrigerator 355 may be associated with the first travel scenario 360. The refrigerator 355 may operate in an economy mode when there are no occupants at the vacation home 310. Thus, the appliance control module 165 may control an operation mode setting of the refrigerator 355 based on the travel scenario 360. Here, the appliance control module 165 may set the refrigerator 355 to operate in a "normal" mode in response to detecting the first travel scenario 360. In a further embodiment, the appliance control module 165 may just the operating mode of the refrigerator 355 and sufficient time so that refrigerator 355 is operating in normal temperatures when the users 315-320 arrive at the vacation home 310.

Further, by monitoring the user position data of the third user 325, the plants control module 165 may detect that the third user 325 is traveling from the primary residence 305 to the vacation home 310 (as indicated by the user movement 110b). Further, based on the position, travel path, and/or travel vector of the third user 325, the appliance control module 165 may determine that the user movement 110b matches a second travel scenario 365. Here, the second travel scenario 365 corresponds to a scenario of "traveling from primary residence to vacation home." Note that the first travel scenario 360 is distinct from the second travel scenario 365 even though the destination (e.g., vacation home 310) is the same for both travel scenarios 360-365.

The second travel scenario 365 differs from the first travel scenario 360 in that it is associated with to smart locations 120 (e.g., the primary residence 305 and the vacation home 310). Thus, detecting the second travel scenario 365 may trigger the appliance control module 165 to control appliance settings of appliances 335-340 located at the primary residence 305 as well the appliances 345-355 located at the vacation home 310.

In certain embodiments, the first HVAC 335 is a multi-zone appliance affecting temperatures at one or more rooms (zones) used exclusively by the third user 325 (such as a bedroom belonging to the third user 325). When the third user 325 leaves the primary residence 305 (heading for the vacation home 310), the appliance control module 165 may identify the one or more rooms (zones) associated exclusively with the third user 325. Further, the appliance control module 165 may control the first HVAC 325 to stop heating/cooling the one or more rooms used exclusively by the third user 325 because the third user 325 has left the primary residence 305.

In one embodiment, a fourth registered user 330 remains the primary residence 305 while the third user 325 travels to the vacation home 310. In a further embodiment, the first water heater 340 may be deactivated when there no occupants at the primary residence 305. In such an embodiment, the appliance control module 165 does not turn off the water heater 340 due to the fourth user 330 remaining at the primary residence 305. However, if the fourth user 330 accompanies the third user 325 and traveling to the vacation home 310, then the appliance control module 165 may deactivate the first water heater 340 based on the second travel scenario 365.

Additionally, the appliance control module 165 may adjust settings of the first HVAC 335 and/or the first water heater 340 based on user preferences of the registered user remaining at the primary residence 305 (e.g., for the user 330). Thus, the appliance control module 165 may just a temperature setting at the primary residence 305 from a temperature preferred by the third user 325 to a temperature preferred by the fourth user 330. This assumes that the third user 325 is given priority over the fourth user 330 with regards to the temperature settings at the primary residence 305. Otherwise, the temperature setting remains the same when the third user 325 leaves the primary residence 305.

In one embodiment, the second HVAC 345 is a multi-zone appliance. For example, the second HVAC 345 may control temperatures at several rooms, including one or more bedrooms, living areas, bathrooms, and the like. The appliance control module 165 may control the second HVAC 345 to achieve specific temperatures (e.g., by applying specific temperature setting values) based on which registered users are traveling to the vacation home. Here, the appliance control module 165 may identify that the first user 315, the second user 320, and the third user 325 are all traveling to the vacation home 310. Accordingly, the appliance control module 165 may identify zones used by the users 315-325 and by specific temperature settings at those zones based on the identities of the users 315-325 traveling to the vacation home 310.

In certain embodiments, the users 315-325 may have different preferred temperature settings for common areas of the vacation home 310 (e.g., as indicated in user profiles belonging to the users 315-325). Accordingly, the appliance control module 165 may apply a conflict management procedures to determine a temperature setting for the common areas of the vacation home 310. In one embodiment, the appliance control module 165 accesses a conflict policy in order to assign a priority to each of the users 315-325. The conflict policy may identify which registered user is to have priority over another registered user. Based on the conflict policy, the appliance control module 165 may select a temperature setting value from a user profile of the user having the highest priority among the users 315-325. Alternatively, the appliance control module 165 may set the temperature at a mean value of the preferred temperatures of the users 315-325.

Figure 4:
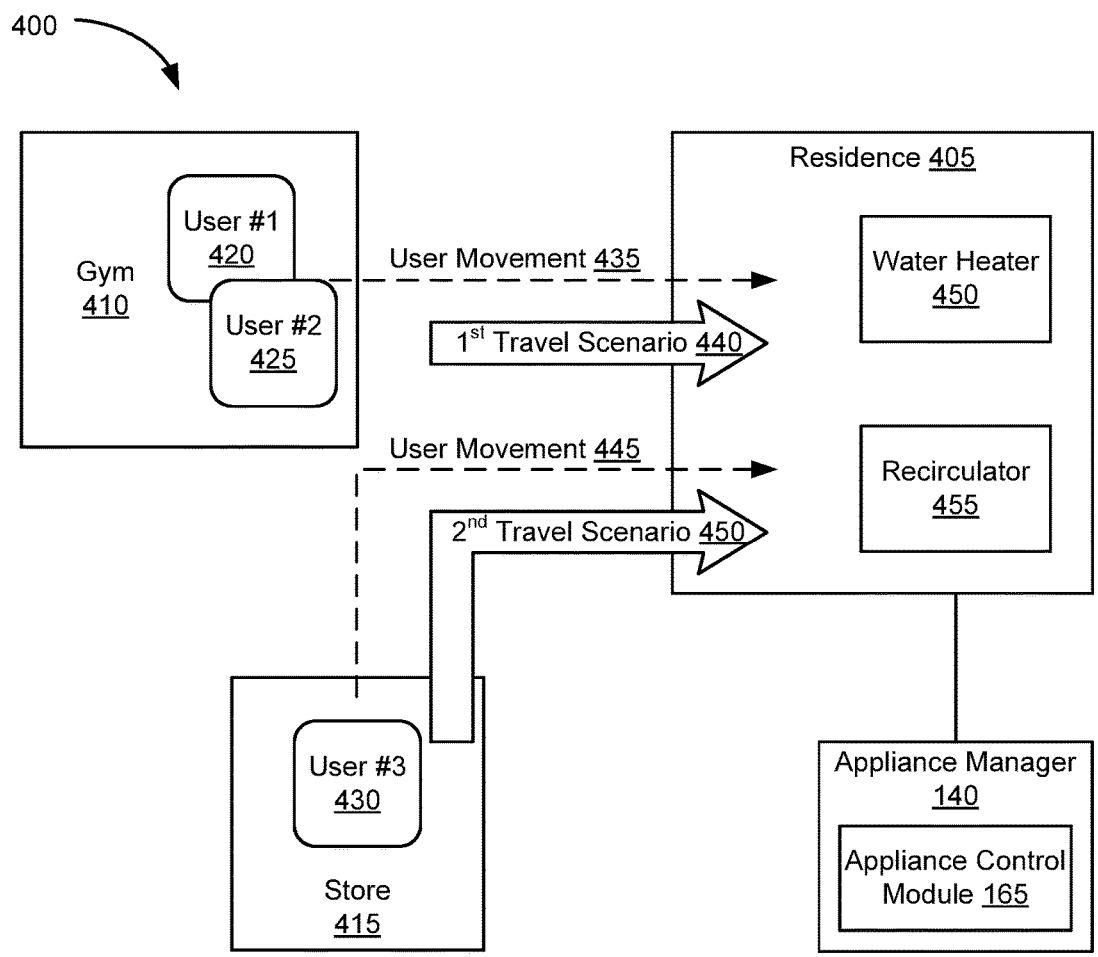
FIG. 4 is a diagram illustrating another embodiment of controlling an appliance setting based on user position.

FIG. 4 is a diagram 400 illustrating another embodiment of controlling an appliance setting based on user position. FIG. 4 depicts an appliance manager 140 which contains an appliance control module 165. The appliance manager 140 and the appliance control module 165 may be substantially as described above with reference to FIGS. 1 and 2. The appliance manager 140 is connectively coupled to a residence 405 which is a smart location 120 containing at least one smart appliance 115. Here, the residence 405 includes a water heater 450 and a water recirculator 455, each of which is a smart appliance 115 capable of being remotely monitored and controlled (e.g., by the appliance manager 140).

FIG. 4 further depicts at least three registered users: a first user 420, a second user 425, and a third user 430. The appliance manager 140, specifically the appliance control module 165, monitors user position data for each of the registered users 420-430. FIG. 4 also depicts user movement (comprising user movement 435 and user movement 445) by the first user 420, the second user 425, and the third user 430.

As depicted, the first user 420 the second user 425 are traveling to residence 405 from the gym 410. Here, the appliance control module 165 monitors the user position data and determines that the user movement 435 matches a first travel scenario 440. The first travel scenario 440 may correspond to a scenario of "traveling to residence from the gym." Detecting the first travel scenario 440 may cause the appliance control module 165 to control the water heater 450 and/or the recirculator 455 according to an identity of the users corresponding to the travel scenario (here, the first user 420 and the second user 425).

In one embodiment, the first user 420 has a habit of taking a shower upon returning to the residence 405 from the gym 410. Accordingly, the appliance control module 165 may control one or more settings of the water heater 450 causing the water heater 450 to prepare hot water for the first user 420 upon his/her return from the gym 410. In a further embodiment, the second user 425 may also have the habit of taking a shower upon returning to the residence 405 from the gym 410. Typically, the appliance control module 165 may also cause the water heater 450 to prepare hot water for the second user 45 upon his/her return from the gym 410.

However, because the first user 420 and the second user 425 are traveling together from the gym 4102 the residence 405, the appliance control module 165 may identify the situation where to registered users correspond to the first travel scenario 440. Based on the number of registered users corresponding to the first travel scenario, the appliance control module 165 may control one or more settings at the water heater 450 causing the water heater 450 to prepare an additional amount of hot water (alternatively, heating the water temperature to a higher temperature), resulting in sufficient hot water for both users 420-425 to take showers upon their return from the gym 410.

FIG. 4 also depicts the third user 430 traveling to the residence 405 from the store 415. Here, the appliance control module 165 monitors user position data for the third user 430 and determines that the user movement 445 matches a second travel scenario 450. The second travel scenario 450 may correspond to a scenario of "traveling to the residents from the store." Detecting the second travel scenario four and 50 may cause the appliance control module 165 to control the water heater 450 and/or the recirculator 455 according to an identity of a registered user corresponding to the travel scenario (here, the third user 430).

Upon detecting the second travel scenario 450, the appliance control module 165 may access a user profile associated with the third user 430. In one embodiment, the user profile may indicate that the third user 430 has a habit of washing his/her hands upon returning to the residence 405 from the store 415. Therefore, based on the identified second travel scenario 450 and the identity of the third user 430, the appliance control module 165 may control the water heater 450 and/or the water recirculator 455 in preparation for the third user 430's arrival at the residence 405.

In one embodiment, the appliance control module 165 may control a setting of the water recirculator 455 causing it to recirculate hot water prior to the third user's 330 arrival at the residence 405, so that hot water is ready at the tap for the user to wash his/her hands. In another embodiment, the appliance control module 165 may also control a setting of the water heater 450 causing it to prepare a quantity of hot water prior to the third user's 330 arrival at the residence 405, so that hot water is ready for the user to wash his/her hands. By controlling the water heater 450 and the water recirculate 455 based on the identified travel scenario (e.g., the second travel scenario 450) and the identity of the registered user (e.g., the third user 430), the appliance control module 165 enhances the comfort of the third user 430 while minimizing operating expenses by operating the water heater 450 and/or recirculator 455 only one triggered by the user movement 445 matching the second travel scenario 450.

Figure 5:
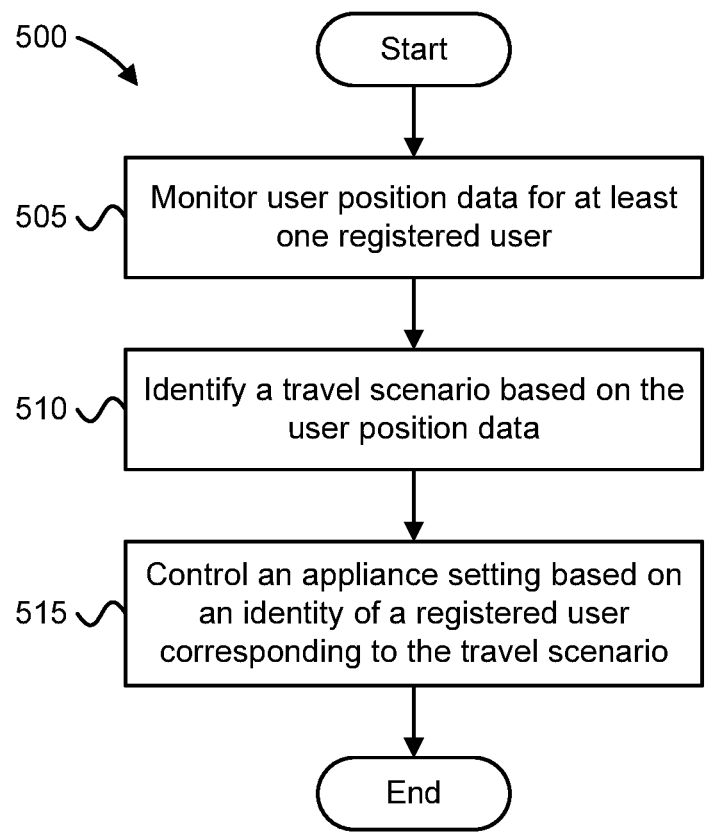
FIG. 5 is a schematic flow chart diagram illustrating one embodiment of a method for controlling an appliance setting based on user position.

FIG. 5 is a schematic flow chart diagram illustrating a method 500 for controlling an appliance setting based on user position, according to embodiments of the disclosure. In one embodiment, the method 500 is performed by the appliance manager 140. In another embodiment, the method 500 may be performed by the apparatus 200. Alternatively, the method 500 may be performed by a processor 145 and a computer readable storage medium, such as the memory 160. The computer readable storage medium may store code that is executed on the processor 145 to perform the functions of the method 500.

The method 500 begins and monitors 505 user position data for at least one registered user. In one embodiment, the user position module 205 monitors 505 user position data for the at least one registered user. In certain embodiments, monitoring 505 user position data includes periodically receiving a current user position of each registered user.

The method 500 identifies 510 a travel scenario based on the user position data. In one embodiment, the scenario module 210 identifies 510 the travel scenario based on the user position data. In some embodiments, identifying 510 the travel scenario includes accessing calendar information for the at least one registered user and identifying a travel scenario for the based on the calendar information. In certain embodiments, identifying 510 the travel scenario includes determining whether a pattern of movement for the least one registered user matches one or more predefined travel scenarios.

The method 500 controls 515 an appliance setting based on an identity of a registered user corresponding to the travel scenario and the method 500 ends. In one embodiment, the appliance setting module 215 controls 515 the appliance setting based on the identity of the registered user corresponding to the travel scenario. In some embodiments, one or more smart appliances may be associated with the travel scenario, wherein controlling 515 the appliance setting includes controlling an appliance setting for each smart appliance associated with the travel scenario.

In one embodiment, controlling 515 the appliance setting includes identifying one or more smart appliances associated with the registered user and selecting a smart appliance based on the travel scenario. In another embodiment, controlling 515 and appliance setting based on an identity of a registered user includes identifying a registered user traveling according to the identified travel scenario, accessing a user profile belonging to the identified registered user, and selecting a value for the appliance setting from the user profile.

In some, controlling 515 the appliance setting includes identifying a plurality registered users traveling according to the identified travel scenario, assigning a priority to each of the plurality registered users based on a conflict policy, and selecting a value for the appliance setting from a user profile belonging to a registered user having the highest priority among the identified plurality of registered users. In certain embodiments, an appliance may control plurality of zones, wherein controlling 515 and appliance setting based on the identity of a registered user may include controlling the appliance setting for a zone associated with the identified registered user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
monitor user position data for at least one registered user;
access calendar information and historical data for the at least one registered user;
identify a travel scenario based on the user position data, the historical data and on the calendar information, the travel scenario having a destination registered with the at least one registered user;
select an appliance from a plurality of appliances located at the destination based on the historical data, the registered user being registered with the selected appliance; and
control a setting of the selected appliance based on an identity of a registered user corresponding to the travel scenario and based on the historical data.

2. The apparatus of claim 1, further comprising code executable by the processor to:
correlate one or more appliances with a travel scenario based on the historical information, wherein controlling the setting of the selected appliance includes the processor controlling a setting for each appliance correlated with the identified travel scenario; and
associate one or more registered users with each appliance, wherein the processor monitoring user position data includes the processor periodically receiving a current user position of each registered user.

3. The apparatus of claim 1, further comprising code executable by the processor to:
identify a plurality of registered users travelling according to the travel scenario, wherein the processor controlling a setting of the appliance based on an identity of a registered user corresponding to the travel scenario includes the processor selecting a value for the appliance setting from a user profile belonging to a registered user having a highest priority among the plurality of registered users.

4. The apparatus of claim 1, wherein the appliance controls a plurality of zones, wherein controlling the setting of the selected appliance based on an identity of a registered user includes the processor controlling a setting for a zone selected using the identity of the registered user.

5. A method comprising:
monitoring, by a processor, user position data for at least one registered user;
accessing historical information for the at least one registered user;
identifying a travel scenario based on the user position data and on the historical information, the travel scenario having a destination registered with the at least one registered user;
selecting an appliance from a plurality of appliances located at the destination based on the historical information, the registered user being registered with the selected appliance; and
controlling an appliance setting of the selected appliance based on an identity of a registered user corresponding to the travel scenario and based on the historical information.

6. The method of claim 5, further comprising:
correlating one or more registered users with an appliance, wherein monitoring user position data includes periodically receiving a current user position of each registered user.

7. The method of claim 5, further comprising:
associating one or more appliances with a travel scenario based on the historical information, wherein controlling the appliance setting includes controlling an appliance setting for each appliance correlated with the identified travel scenario.

8. The method of claim 5, further comprising:
correlating one or more appliances with a registered user; and
wherein selecting an appliance from a plurality of appliances located at the destination comprises selecting an appliance based on the identity of a registered user corresponding to the travel scenario, the appliance selected from the one or more appliances correlated with the identified registered user.

9. The method of claim 5, wherein the historical information comprises user movement history, the method further comprising:
defining the travel scenario based on the user movement history; and identifying an appliance that experiences an appliance setting changes related to the user movement history, wherein controlling the appliance setting comprises changing an appliance setting of the identified appliance.

10. The method of claim 5, wherein the appliance controls a plurality of zones, wherein controlling an appliance setting of the selected appliance based on an identity of a registered user includes controlling the appliance setting for a zone associated with the registered user.

11. The method of claim 5, wherein controlling an appliance setting of the selected appliance based on an identity of a registered user corresponding to the travel scenario includes:
  identifying a registered user traveling according to the travel scenario;
  accessing a user profile belonging to the identified registered user; and
  selecting a value for the appliance setting from the user profile.

12. The method of claim 5, wherein controlling an appliance setting of the selected appliance based on an identity of a registered user corresponding to the travel scenario comprises:
  identifying a plurality of registered users traveling according to the travel scenario;
  assigning a priority to each of the plurality of registered users based on a conflict policy; and
  selecting a value for the appliance setting from a user profile of a registered user having a highest priority among the identified plurality of registered users.

13. The method of claim 5, further comprising:
  accessing calendar information for the at least one registered user, wherein identifying a travel scenario is further based on the calendar information.

14. A program product comprising a computer readable storage medium that is not a transitory signal and that stores code executable by a processor, the executable code comprising code to:
  monitor user position data for at least one registered user;
  access calendar information for the at least one registered user;
  identify a travel scenario based on the user position data, user history and on the calendar information, the travel scenario having a destination registered with the at least one registered user;
  select an appliance from a plurality of appliances located at the destination based on the user history, the registered user being registered with the selected appliance; and
  control an appliance setting of the selected appliance based on an identity of a registered user corresponding to the travel scenario and based on the user history.

15. The program product of claim 14, the executable code further comprising code to:
  associate one or more registered users with an appliance, wherein monitoring user position data includes periodically receiving a current user position of each registered user.

16. The program product of claim 14, the executable code further comprising code to:
  identify a plurality of registered users travelling according to the travel scenario,
  wherein controlling an appliance setting of the selected appliance based on an identity of a registered user corresponding to the travel scenario includes selecting a value for the appliance setting from a user profile belonging to a registered user having a highest priority among the plurality of registered users travelling according to the travel scenario.

17. The program product of claim 14, the executable code further comprising code to:
  link one or more appliances with a travel scenario based on the user history,
  wherein controlling an appliance setting includes controlling a setting for each appliance linked with the identified travel scenario.

* * * * *